United States Patent [19]

Hahn

[11] Patent Number: 5,540,283
[45] Date of Patent: Jul. 30, 1996

[54] WELL PUMPING

[75] Inventor: Warren J. Hahn, Katy, Tex.

[73] Assignee: Atlantic Richfield Company, Los Angeles, Calif.

[21] Appl. No.: 406,429

[22] Filed: Mar. 20, 1995

[51] Int. Cl.⁶ .................................................. E21B 33/08
[52] U.S. Cl. ........................ 166/379; 74/18.2; 166/81.1
[58] Field of Search .............................. 166/379, 81, 84; 74/18.2; 277/19, 230

[56] References Cited

U.S. PATENT DOCUMENTS

| | | | |
|---|---|---|---|
| 113,638 | 4/1871 | Dewey | 166/81 |
| 2,196,676 | 4/1940 | Johnson et al. | 277/30 |
| 3,186,722 | 6/1965 | Johnston | 166/84 X |
| 3,270,810 | 9/1966 | Johnston | 166/81 X |
| 3,353,606 | 11/1967 | Dyer | 166/84 |
| 3,369,411 | 2/1968 | Hines | 74/18.2 |
| 3,796,103 | 3/1974 | Winfield, Jr. | 74/18.2 |
| 3,953,037 | 4/1976 | Winfield, Jr. | 74/18.2 |
| 4,951,743 | 8/1990 | Henderson | 166/84 |
| 5,150,751 | 9/1992 | Burton | 166/81 |

*Primary Examiner*—Hoang C. Dang
*Attorney, Agent, or Firm*—Roderick W. MacDonald; John L. Wood

[57] ABSTRACT

A method and apparatus for protecting a polished rod of a pumping unit so that the portion of the polished rod that passes out of the top of a stuffing box of a wellhead on the upstroke of the polished rod is protected from the environment surrounding the wellhead. The method and apparatus also assist with containment of well fluids which may escape from the stuffing box.

11 Claims, 3 Drawing Sheets

5,540,283

WELL PUMPING

BACKGROUND OF THE INVENTION

When naturally occurring subterranean pressure from gas, water and the like in an oil reservoir has fallen to a point that a well will not produce oil and gas at the earth's surface by way of such natural pressure, some method of artificial lift is necessary to continue producing liquid oil from that well.

A number of artificial lift techniques can be employed in such a situation, one of the most common being downhole pumps employed at the bottom of the well and operated by reciprocation of a string of sucker rods that extend from the downhole pump to the earths surface and a pumping unit situated thereat. The pumping unit reciprocates the sucker rod string and the downhole pump thereby actuating the pump. Each well is capped at the earth's surface with a wellhead to contain oil that is pumped to the earth's surface and to direct same through a conduit means (connected to the wellhead) to a collection site. The sucker rod string must necessarily extend out the top of the wellhead to reach the pumping unit. A seal is employed for preventing oil from passing out of the top of the wellhead where the sucker rod string exits. This seal means is conventionally called a stuffing box because of the stuffing, seal, or packing element therein that is employed to provide a seal around the sucker rod string to prevent oil leakage out of the stuffing box. In order to get a better seal at the stuffing box the portion of the sucker rod string that reciprocates through the stuffing box packing element(s) is specially coated and polished to give it a smooth surface. That particular section of the sucker rod string is called the polished rod.

The polished rod is lubricated with oil and or well fluids to reduce wear on the packing elements used as seal means inside the stuffing box. On the upstroke of the reciprocating polished rod a substantial length, e.g., 15 to 20 feet, of polished rod is pulled upward from inside the well through the stuffing box into the open atmosphere above the wellhead and stuffing box. Accordingly, during the full upstroke a long length and large surface area of oil coated sucker rod is exposed to the environment and often picks up wind borne particulates such as dust or even sand on its exposed oily surface. On the following full downstroke of the polished rod the particulates adhering to the surface thereof are carried into the stuffing box and through the seal (packing) elements thereby causing wear on those elements. Over time this makes the stuffing box more prone to leak well fluids into the environment where the polished rod exits the top of the stuffing box.

If for any reason the well is not pumped for a period of time the polished rod is not reciprocated through the stuffing box and the packing elements in the stuffing box can sometimes dry out so that when the pumping unit is again actuated well fluids can leak past the dried out packing and into the atmosphere surrounding the top of the wellhead.

If left leaking for a long enough period of time, a collection of oil on the ground near the base of the wellhead can accumulate. Also, during the upstroke of the polished rod well fluids may spray from the seal area of the stuffing box if the internal wellhead pressure is sufficiently high.

This invention provides an apparatus whereby normal pumping with the pumping unit and polished rod can be carried on, but the portion of the polished rod that exits the stuffing box on the upstroke is protected from the atmospheric elements outside the stuffing box. In addition, the stuffing box is contained in a manner such that any oil leakage therefrom even under pressure will be caught and contained at the wellhead in a manner such that such leakage does not reach the atmosphere or the ground and is caught in an easily disposable manner.

SUMMARY OF THE INVENTION

In accordance with this invention, there is provided a method and apparatus for protecting from the environment above said stuffing box, at least the portion of the polished rod that passes through the stuffing box on the upstroke of the polished rod.

By this invention the life of the packing element(s) inside the stuffing box is substantially increased and if those packing elements should eventually tend to leak well fluids outside of the stuffing box, the apparatus of this invention provides a second function to contain and collect any such leaking well fluids so that such leakage does not reach the atmosphere outside the wellhead and stuffing box.

Accordingly, it is an object of this invention to provide a new and improved method and apparatus for protecting a polished rod. It is another object to provide a new and improved method and apparatus for extending the sealing life of the packing elements of a stuffing box. It is another object to provide a new and improved method and apparatus for leak containment from a production wellhead. Other aspects, objects and advantages of this invention will be apparent to those skilled in the art from this disclosure and the appended claims.

DETAILED DESCRIPTION OF THE INVENTION

Figures 1, 2:
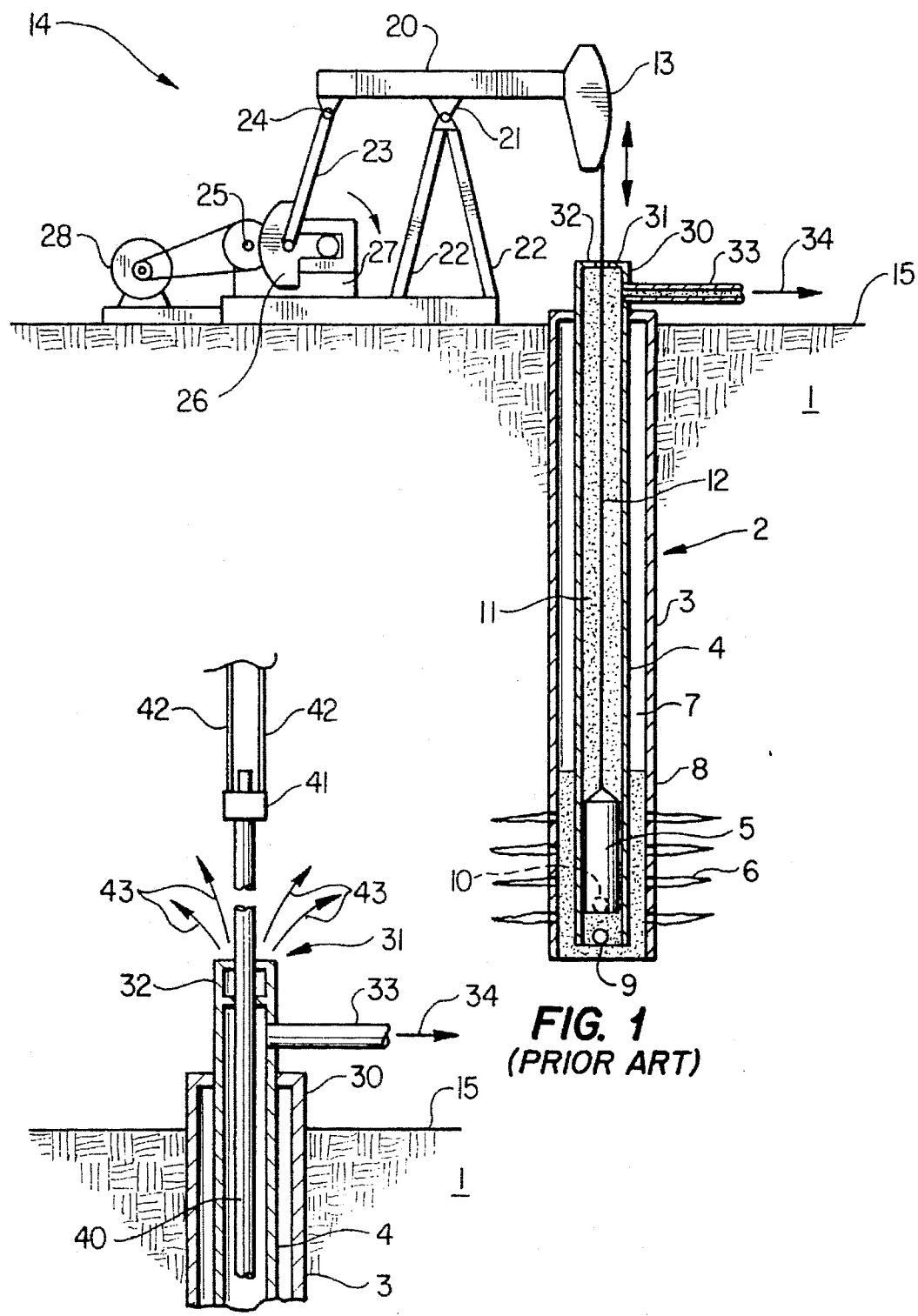
FIG. 1 shows a cross section of a producing oil and gas well having a downhole pump and sucker rod string which is connected to a surface pumping unit.
FIG. 2 shows a cross-section of a typical wellhead with its stuffing box and polished rod.

More specifically, FIG. 1 shows the earth 1 having a wellbore 2 extending downwardly thereunto, wellbore 2 containing casing 3 which lines wellbore 2. Casing 3 contains production tubing 4 therein at the bottom of which is carried downhole pump 5. Perforations 6 in casing 3 allow oil from the oil bearing rock reservoir surrounding perforations 6 and which wellbore 2 penetrates to flow into the annulus 7 between tubing 4 and casing 3 as shown at 8. Oil 8 is then pumped from annulus 7 through check valve 9 by reciprocation of downhole pump 5 and the action of its check valve 10 so that oil is pumped from annulus 7 into the interior of tubing 4 as shown by 11. This pumping action is accomplished by reciprocation of sucker rod string 12 which is connected to downhole pump 5 at its lower end and to horsehead 13 of pumping unit 14 on earth's surface 15.

Pumping unit 14 is composed of a walking beam 20 pivoted at 21 on support means 22. At the rear of walking beam 20 pitman 23 is pivotally connected at 24 to walking beam 20 and at 25 to rotatable crank and counterweight 26. Counterweight 26 is operably connected to gear reducer 27 which is driven by prime mover 28. Upon operation of prime mover 28 horsehead 13 is reciprocated upwardly and downwardly which in turn reciprocates both sucker rod string 12 and downhole pump 5 to yield the desired pumping action and force oil into tubing 4 and thence to the earth's surface 15 inside wellhead 30. Sucker rod string 12 extends out of the top 31 of wellhead 30 at stuffing box 32 which contains therein one or more conventional seal or packing elements as shown in FIG. 3, while oil flows from wellhead 30 through conduit means 33 as shown by arrow 34 to remotely located storage, transportation or other disposal means for that oil.

FIG. 2 shows an enlargement of wellhead 30. The section of sucker rod string 12 which continually reciprocates through stuffing box 32 and its packing elements is polished rod 40 which is connected by means of carrier bar 41 to bridle 42 which in turn is connected to horsehead 13. Bridle 42 is flexible wire rope for curving around horsehead 13 when horsehead 13 is at its upper most point of its full upstroke. If the conventional packing elements of stuffing box 32 should become dried out, worn out, or otherwise start to leak oil from inside wellhead 30 to the atmosphere outside and surrounding top 31 of the wellhead as shown by arrows 43, oil can be sprayed into the atmosphere (if sufficient pressure is present within wellhead 30) and/or fall around wellhead 30 down to earth's surface 15.

Figure 3:
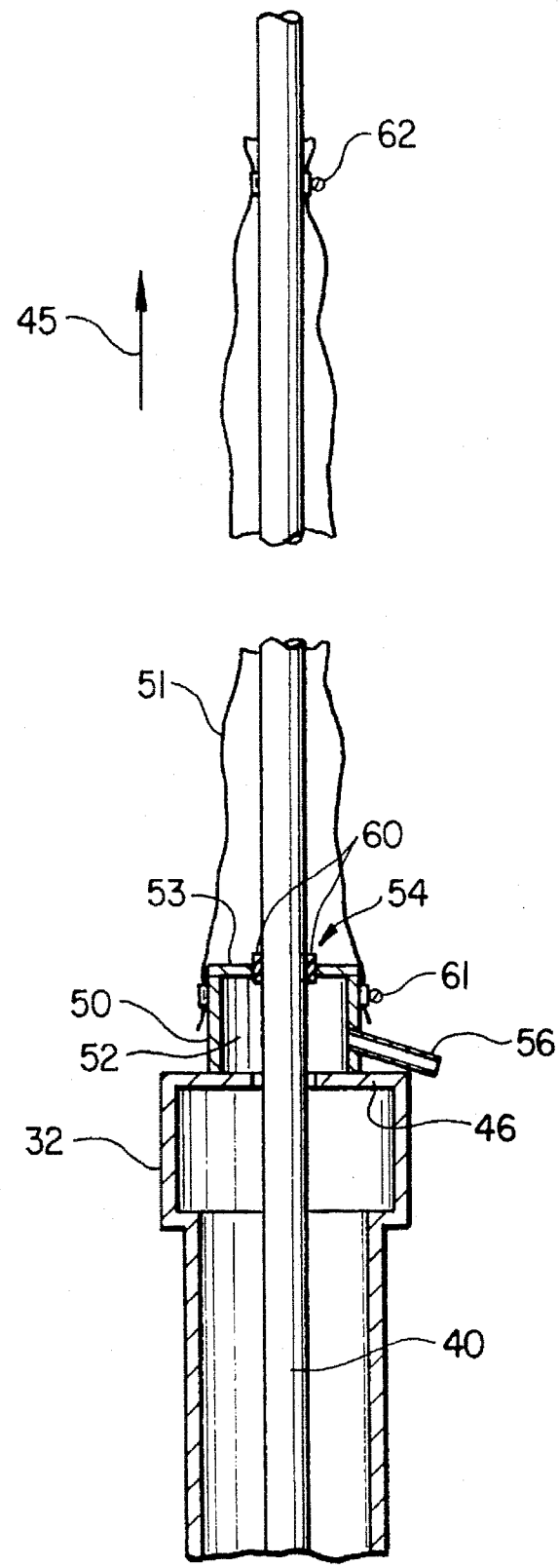
FIG. 3 shows one embodiment of the apparatus of this invention in place on the wellhead of FIG. 2 and in the full upstroke position of the polished rod.

FIG. 3 shows the upper portion of stuffing box 32 with polished rod 40 extending therethrough in its full upstroke position as shown by arrow 45. The length of polished rod 40 which passed through stuffing box 32 during the upstroke is shown by A. Length A can be considerable, for example 15 or 20 feet. Length A of polished rod 40 is, therefore, that portion of the polished rod that passes through stuffing box 32 and out the top portion 46 thereof. Thus, the surface of length A of polished rod 40 is the surface that is exposed to the environment outside the wellhead and above the stuffing box which can pick up solid airborne particulates by way of the oil film thereon. In the following downstroke of polished rod 40 length A of that polished rod will pass into the interior of stuffing box 32 and through the sealing element or elements therein and in so doing will force solid particulates picked up on the upstroke through those packing elements causing wear thereon and reducing the sealing life of those elements.

In accordance with this invention length A of polished rod 40 is protected by the combination of collar 50 and flexible sleeve 51.

Collar 50 is a relatively inflexible, preferably relatively heavy, device having an essentially hollow interior 52, an upper closed end 53 which has an aperture 54 fitted with a seal means 60 therein through which polished rod 40 reciprocates, and lower end 55. The seal means 60 can be any conventional sealing member such as a conventional rubber o-ring seal or packing element, which is rigidly affixed to the inner surface of aperture 54. Lower end 55 of collar 50 abuts top portion 46 of stuffing box 32 and has an opening through which polished rod 40 can reciprocate.

Fixed in liquid tight manner to collar 50 by way of clamp 61 is the lower end of flexible sleeve 51 which is a hollow tube that surrounds polished rod 40 and extends at least to and preferably a little beyond length A of polished rod 40. Clamp 62 fixes the upper end of sleeve 51 in a liquid tight manner to polished rod 40. Thus, the entirety of length A is protected by the combination of collar 50 and sleeve 51.

Collar 50 preferably carries a drain conduit 56 which is in open fluid communication with hollow interior 52 so that fluids collected in interior 52 can drain out through conduit 56 to be collected in a container for disposal. A tube or flexible hose (not shown) can be connected to conduit 56 for routing of collected fluids to a suitable container.

Collar 50 can be made out of heavy metal so that its weight alone keeps collar 50 essentially fixed to top 46 of stuffing box 32. However, preferably, collar 50 is physically attached to stuffing box 32 such that reciprocation of the polished rod 40 through aperture 54 and seal means 60 does not result in movement of collar 50. In either case, it is preferred that collar 50 be of sufficient weight or be fixed to stuffing box 32 in a manner such that well fluids will not leak through the interface between collar 50 and stuffing box 32. A flexible liquid seal can be employed between lower end 55 and top portion 46 if desired.

Figure 6:
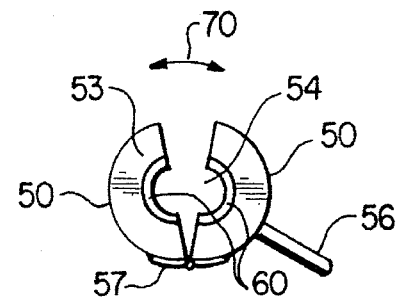
FIG. 6 shows a top view of the collar element of FIG. 5.
Figure 5:
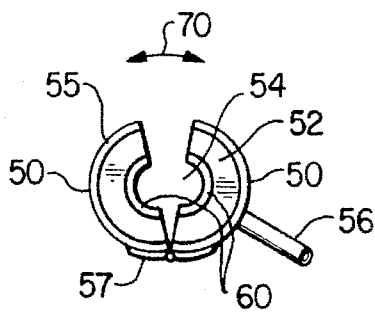
FIG. 5 shows a bottom view of an embodiment of the collar element of the apparatus shown in FIG. 3.
Figure 7:
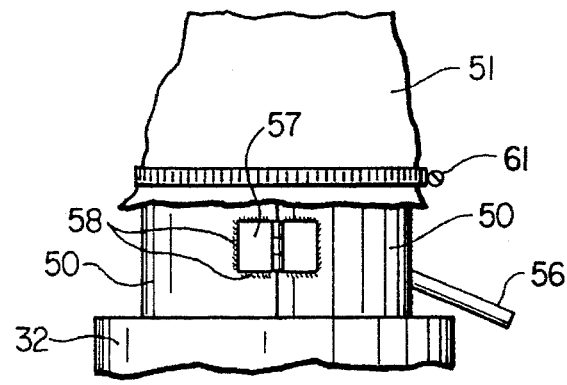
FIG. 7 shows a partial side view of the collar element of FIGS. 5 and 6 installed on the wellhead of FIG. 2.

In a preferred embodiment, as shown in FIGS. 5–7, collar 50 has a generally cylindrical shape which is cut through a diameter of said cylinder such that the collar comprises two essentially equal halves. The halves are attached at one end of the diameter on the exterior of the cylinder through pivot means 57. Pivot means 57 is conveniently a hinge which is attached to each of the two halves of collar 50 by means of welds 58. Thus, the two halves may be pivotally opened and closed using the pivot means as shown generally by arrows 70. In this embodiment, collar 50 can be conveniently installed (or removed) by simply closing (or opening) the two halves of collar 50 about polished rod 40. The two halves of collar 50 may then be secured around polished rod 40 by physical attachment of the two halves at the other side of collar 50, or simply by use of clamp 61 when sleeve 51 is attached to collar 50 as shown in FIG. 7.

By so enclosing length A of polished rod 40 there is provided a closed space for polished rod 40 to reciprocate within which keeps atmospheric particulate matter from coming into contact with and adhering to polished rod 40, and, in addition, prevents air drying of the lubricating film on the outer surface of polished rod 40. In addition, the combination of collar 50 and sleeve 51 will contain and collect any fugitive well fluids that may escape from the top of stuffing box 32. Seal means 60 within aperture 54 of collar 50 also provides the function of removing any excess fluid that may be coating the polished rod 40 during the upstroke portion of its reciprocation and thereby reduces fouling of the sleeve with well fluids.

Sleeve 51 can be composed of any flexible, airtight, strong, durable, chemical and heat resistant fabric such as conventional industrial fabrics, for example, industrial nylon fabric, preferably nylon with a urethane coating to prevent fluid seepage. Such fabrics will keep particulate matter from coming into contact with the outside of polished rod 40 along length A and will prevent air drying of the thin lubricating fluid film on polished rod 40 along length A.

Thus, it can be seen that the combination of collar 50 and sleeve 51 encompasses essentially all of length A which is the length of the polished rod surface that passes through top portion 46 of stuffing box 32 and which surface would be exposed to the environment above stuffing box 32 but for its being encased in the sleeve and collar combination. This way, on the full upstroke of polished rod 40 as shown in FIG. 3, essentially all of the polished rod surface that is exposed above top portion 46, which is the same polished rod surface that will pass into the interior of stuffing box 32 on the following full downstroke of the polished rod, is encompassed and protected by the sleeve and collar combination of this invention.

Figure 4:
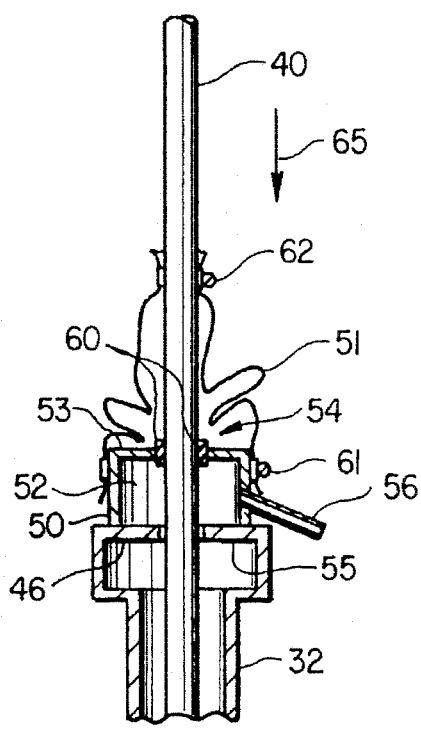
FIG. 4 shows the apparatus of FIG. 3 with the polished rod in the full downstroke position.

FIG. 4 shows the same apparatus of FIG. 3 except that polished rod 40 is in the full downstroke position as indicated by arrow 65. FIG. 4 shows sleeve 51 to be in a folded up or collapsed configuration whereas it was shown to be in an extended configuration in FIG. 3. Essentially all of length A of polished rod 40 as shown in FIG. 3 has now passed through collar 50 and stuffing box 32 down into the interior of the wellhead and below.

FIG. 5 shows a bottom view of one embodiment of collar 50 indicating that the lower end of collar 50 in this embodiment is essentially open, i.e., of essentially the same diameter as the inside diameter of the collar body itself whereas top portion 53 is essentially closed but for aperture 54 with seal means 60 therein through which essentially only polished rod 40 can pass.

FIG. 6 is a top view of the collar of FIG. 5 showing the closed upper end 53 but for aperture 54.

FIG. 7 is a partial side view of the collar embodiment shown in FIGS. 5 and 6 which is installed with sleeve 51 on stuffing box 32.

As an example, a round, cylindrically shaped, steel collar approximately 4 inches in inner diameter and 4 inches in height is employed for collar 50 with a 4 inch long drain pipe 56 formed from 1 inch outside diameter conventional steel pipe. This collar 50 is cut into two equal halves in the manner as shown in FIGS. 5 and 6, and a conventional hinge 57 is welded to pivotally attach the two halves. Seal means 60 is a conventional o-ring shaped rubber seal member which is attached to the inner surface of aperture 54. Sleeve 51 is a 6 inch diameter 15 foot long tube formed of 1,000 denier industrial nylon fabric with a urethane coating thereon. Conventional hose clamps are employed for fixing means 61 and 62 for securing the sleeve 51 and also to secure collar 50 around polished rod 40. For installation, pumping unit 14 is stopped, polished rod 40 immobilized by placing a clamp above stuffing box 32, and both carrier bar 41 and bridle 42 disconnected from polished rod 40. Collar 50 is then closed around polished rod 40 and sleeve 51 is then slipped down over the unobstructed polished rod 40. The top of sleeve 51 is clamped to polished rod 40 approximately 6 inches above the top of the upper most upstroke position and the bottom end of sleeve 51 is similarly hose clamped to the top of collar 50 as shown in FIGS. 3 and 7. Collar 50 is bolted (not shown on FIGS. 4 and 7) to stuffing box 32. The pumping unit is then started up and operated with sleeve 51 alternately extending and collapsing as shown in FIGS. 3 and 4 as polished rod 40 is repeatedly reciprocated through stuffing box 32.

Reasonable variations and modifications are possible within the scope of this disclosure without departing from the sphere and scope of this invention.

What is claimed is:

1. In a wellhead for a well having a stuffing box with a closed top portion through which top portion a polished rod reciprocates when said well is producing fluid, the improvement comprising a collar having an essentially hollow interior and having upper and lower ends, said upper end being closed and having an aperture therein and a seal means affixed within the aperture through which said polished rod reciprocates, said lower end abutting said top portion of said stuffing box and having an opening through which said polished rod reciprocates, said collar carrying a drain conduit in fluid communication with said hollow interior, an elongate flexible sleeve carried by said collar and fixed to said polished rod so that said sleeve and collar in combination encompass essentially all of the polished rod surface that passes through said top portion of said stuffing box on said upstroke and which surface would be exposed to the environment above said stuffing box but for its being encased in said sleeve and collar, whereby on the full upstroke of said polished rod essentially all of the polished rod surface that is exposed above said top portion of said stuffing box and which will pass into said stuffing box on the following full downstroke is encompassed and protected by said sleeve and collar combination.

2. The invention of claim 1 wherein said collar rests on and is physically connected to said stuffing box.

3. The invention of claim 1 wherein said collar comprises two essentially equal halves attached with a pivot means such that the two halves may pivotally open and close about the polished rod during assembly and disassembly of the collar and sleeve.

4. The invention of claim 3 wherein said collar is shaped in the form of a cylinder.

5. The invention of claim 4 wherein said pivot means is a hinge.

6. The invention of claim 1 wherein said lower end of said collar is essentially open.

7. The invention of claim 1 wherein said sleeve is composed of industrial fabric.

8. The invention of claim 7 wherein said industrial fabric is nylon having a urethane coating.

9. In a method for pumping fluids from a well using a reciprocating downhole pump carried by a sucker rod string that extends to the earth's surface and passes through a stuffing box at the earth's surface, said sucker rod string being repeatedly reciprocated through said stuffing box from a full upstroke position to a full downstroke position, the improvement comprising encasing in an at least partially collapsible flexible member essentially all of said sucker rod string that passes through said stuffing box on said upstroke and which surface would be exposed to the environment above said stuffing box but for said encasing, sealing the interior of the flexible member from said fluids which may leak through said stuffing box such that said fluids essentially do not foul the flexible member with said fluids, collapsing said member on the following downstroke of said sucker rod string, and alternately extending and collapsing said member as said sucker rod string moves to its full upstroke position and then to its full downstroke position.

10. In a method for pumping fluids from a well having a reciprocating downhole pump carried by a sucker rod string that extend to the earth's surface and passes through a stuffing box at the earth's surface, said sucker rod string being repeatedly reciprocated through said stuffing box from a full upstroke position to a full downstroke position, the improvement comprising encasing in an at least partially collapsible flexible member having an upper end and a lower end essentially all of said sucker rod string that passes through said stuffing box on said upstroke and which surface would be exposed to the environment above said stuffing box but for said encasing; containing said fluids which may leak through said stuffing box by use of a collar affixed to the lower end of said flexible member, said collar comprising an essentially hollow interior and an upper enclosed end having an aperture through which said sucker rod string reciprocates, said aperture having a seal means fitted therein; collapsing said member on the following downstroke of said sucker rod string; and alternately extending and collapsing said member as said sucker rod string moves to its full upstroke position and then to its full downstroke position.

11. In a method for pumping fluids from a well having a reciprocating downhole pump carried by a sucker rod string that extend to the earth's surface and passes through a stuffing box at the earth's surface, said sucker rod string being repeatedly reciprocated through said stuffing box from a full upstroke position to a full downstroke position, the improvement comprising encasing in an at least partially collapsible flexible member having an upper end and a lower end essentially all of said sucker rod string that passes through said stuffing box on said upstroke and which surface would be exposed to the environment above said stuffing box but for said encasing; containing said fluids which may leak through said stuffing box by use of a collar affixed to the lower end of said flexible member, said collar comprising an essentially hollow interior and an upper enclosed end having an aperture through which said sucker rod string reciprocates, said aperture having a seal means fitted therein; routing said fluids from the hollow interior of said collar through a conduit which provides for fluid communication between the hollow interior of said collar to an exterior container for said fluids; collapsing said member on the following downstroke of said sucker rod string; and alternately extending and collapsing said member as said sucker rod string moves to its full upstroke position and then to its full downstroke position.

\* \* \* \* \*